United States Patent
Mozano (10) Patent No.: US 11,764,979 B2
(45) Date of Patent: Sep. 19, 2023

(54) CUSTOMER-CONTROLLED AUTHENTICATION

(71) Applicant: ServiceNow, Inc., Santa Clara, CA (US)

(72) Inventor: Ashton Mozano, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 189 days.

(21) Appl. No.: 17/334,375

(22) Filed: May 28, 2021

(65) Prior Publication Data

US 2022/0385482 A1  Dec. 1, 2022

(51) Int. Cl.
*G06F 21/33* (2013.01)
*H04L 9/32* (2006.01)
*H04L 9/40* (2022.01)

(52) U.S. Cl.
CPC ............ *H04L 9/3268* (2013.01); *G06F 21/33* (2013.01); *H04L 63/0823* (2013.01)

(58) Field of Classification Search
CPC .... H04L 9/3268; H04L 63/0823; G06F 21/33
See application file for complete search history.

(56) References Cited

U.S. PATENT DOCUMENTS

| | | | | |
|---|---|---|---|---|
| 2013/0297933 | A1* | 11/2013 | Fiducia | H04L 63/0823 713/156 |
| 2016/0381006 | A1* | 12/2016 | Rykowski | H04L 63/0823 713/156 |
| 2019/0205533 | A1* | 7/2019 | Diehl | G06F 21/567 |

* cited by examiner

*Primary Examiner* — Nelson S. Giddins
(74) *Attorney, Agent, or Firm* — Van Pelt, Yi & James LLP (57) ABSTRACT

A certificate credential and an associated signature is received. The certificate credential and the associated signature are authenticated at an operating system level. Whether the certificate credential has expired is validated at an application level via an external certificate authority. Access to encrypted data is allowed based at least in part on the authentication and the validation of the certificate credential.

20 Claims, 6 Drawing Sheets

CUSTOMER-CONTROLLED AUTHENTICATION

BACKGROUND OF THE INVENTION

Cloud-based solutions allow businesses to rapidly build and deploy software applications. These solutions allow their customers to direct their focus on business needs by replacing significant portions of their IT system with a unified cloud-hosted service platform. For example, a cloud-hosted service platform can include one or more application servers or application nodes as well as one or more database servers. Unlike self-hosting, a cloud-hosted software and hardware solution can be quickly scaled up and down to provide customers with increased flexibility and control. In order to protect customer data and for improved security, a cloud-based solution can utilize encrypted network connections and data, such as customer data stored on cloud-hosted database servers, can be encrypted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A cloud-based platform with customer-controlled authentication is disclosed. For example, using the disclosed techniques, a customer of a cloud-based service maintains control over whether clients can authenticate into the customer's cloud-based services that are hosted by a service provider. Even in the event the cloud-based service is managed by an independent and third-party software-as-a-service provider, the customer has the ultimate authority over whether users, clients, and/or services can access the provided cloud-based services. For example, database requests from an application node for encrypted customer data are controlled by the customer even though the application node and database server are both remotely located and managed by the cloud provider. Using the disclosed techniques, customers can delegate management of cloud-based services to an independent and third-party service provider while still maintaining control over who can access their data. For example, in the event access to customer data stored on cloud-based database servers should be withdrawn, the customer can immediately revoke access to any applicable database servers and consequently deny access to the customer data from database queries to the database servers. While the disclosed techniques are appropriate and may be discussed in the context of database servers, the disclosed customer-controlled authentication techniques can be applied to other application servers as well, such as email servers, file servers, customer management servers, security and authentication servers, etc.

In some embodiments, a cloud-based platform with customer-controlled authentication is configured by having a customer generate private keys for any network client authorized by the customer to have access to a controlled application service. For example, a network client such as an application node may be configured to access a database server to query customer data including encrypted customer data. Both the network client, such as an application node, and the application service, such as a database service provided by a database server, can be cloud-based. For example, both can be hosted by an independent and third-party software-as-a-service provider. As part of a configuration step, the appropriate private keys are provided to the applicable clients authorized by the customer to access the controlled application service. In some embodiments, the generated private keys are stored by applicable clients using an appropriate key management system. Along with the private keys, corresponding certificate credentials and their associated signatures are generated for each applicable client. The private keys and their corresponding certificates with associated signatures are utilized by the application server such as a database server to confirm and authenticate the identity of approved network clients. In various embodiments, a client certificate is issued using the identity of the approved client, such as the hostname and/or Internet Protocol (IP) address of a specific network client. The associated signature of a certificate is an issuer's digital signature. For example, the associated signature can be signed by an issuing certificate authority and verifies the certificate's contents. In various embodiments, each certificate includes the public key pair of the generated private key.

In the context of managing authentication to application servers, any applicable servers are configured to only allow access using the corresponding certificate credentials of the approved network clients. Other forms of authentication such as a username and password combination are disabled. In some embodiments, the client certificates are each signed by a certificate authority and each includes an associated digital signature to verify the identity of a client requesting access to an application service. Any access to an application service, such as a database, email, or file sharing service, requires a network client to first authenticate using a client certificate with the operating system of the application server hosting the service. For example, a database query from an application node to a database server first authenticates the application node with the database server's operating system using the application node's installed certificate and corresponding private key. In the event the application node is authenticated, the associated database request is propagated to the database system layer where the application node's certificate can be further validated. For example, the database system can confirm with the issuing authority that the application node's certificate is valid, has not been revoked, and is not expired. Only once the database system has confirmed the validity of the application node's certificate credentials is the database engine allowed to process the database request. Only an approved request can proceed with access to the stored and potentially encrypted customer data. In the event the authentication or certificate validation fails, any and all database access along with access to customer data stored on the database server is denied.

In various embodiments, prior to authorizing a client access to a configured server, such as a customer's cloud-based database server, the relevant certificate is first validated. For example, a security check is performed to enforce that the installed client certificate is valid and is not expired or revoked. Additional checks such as Internet Protocol (IP) address and/or hostname checks can be performed as well. In some embodiments, the client certificates are issued to users rather than network client devices and can contain user identity information such as an email address or name. Regardless of the type of client certificate, in the event a customer wishes to withdraw access for a client to an associated application service, the customer can revoke or expire the corresponding client's certificate. Once the certificate is no longer valid, subsequent access to the application service will be denied. For example, when a client attempts to authenticate with the database server, the authentication will fail and access to the database engine and corresponding customer data will be denied. If at any point a customer wishes to re-enable access, the customer can reissue new credentials or reactivate the appropriate client certificate by coordinating with the certificate authority.

In some embodiments, a certificate credential and an associated signature is received. For example, a database client such as an application node is installed with a client certificate configured to identify the database client. The installed certificate includes a digital signature verifying the authenticity of the certificate and the identity of the client. The client provides the certificate credential and the associated signature to the database server to authenticate access to the database server as part of a database request. In some embodiments, the certificate credential and the associated signature are authenticated at an operating system level. For example, the operating system authenticates the client by confirming that the client holds the private keys associated with the client's certificate. In some embodiments, whether the certificate credential has expired is validated at an application level via an external certificate authority. For example, once the client is authenticated at the operating system level, the associated application request is propagated to the application level where the certificate credential is validated before processing the application request. An external certificate authority can be utilized to confirm that the certificate credential has not been revoked or is not expired. Access to encrypted data is allowed based at least in part on the authentication and the validation of the certificate credential. For example, once the certificate credential is validated at the application level, the included service request, such as a database query, can be processed by the application service.

Figure 1:
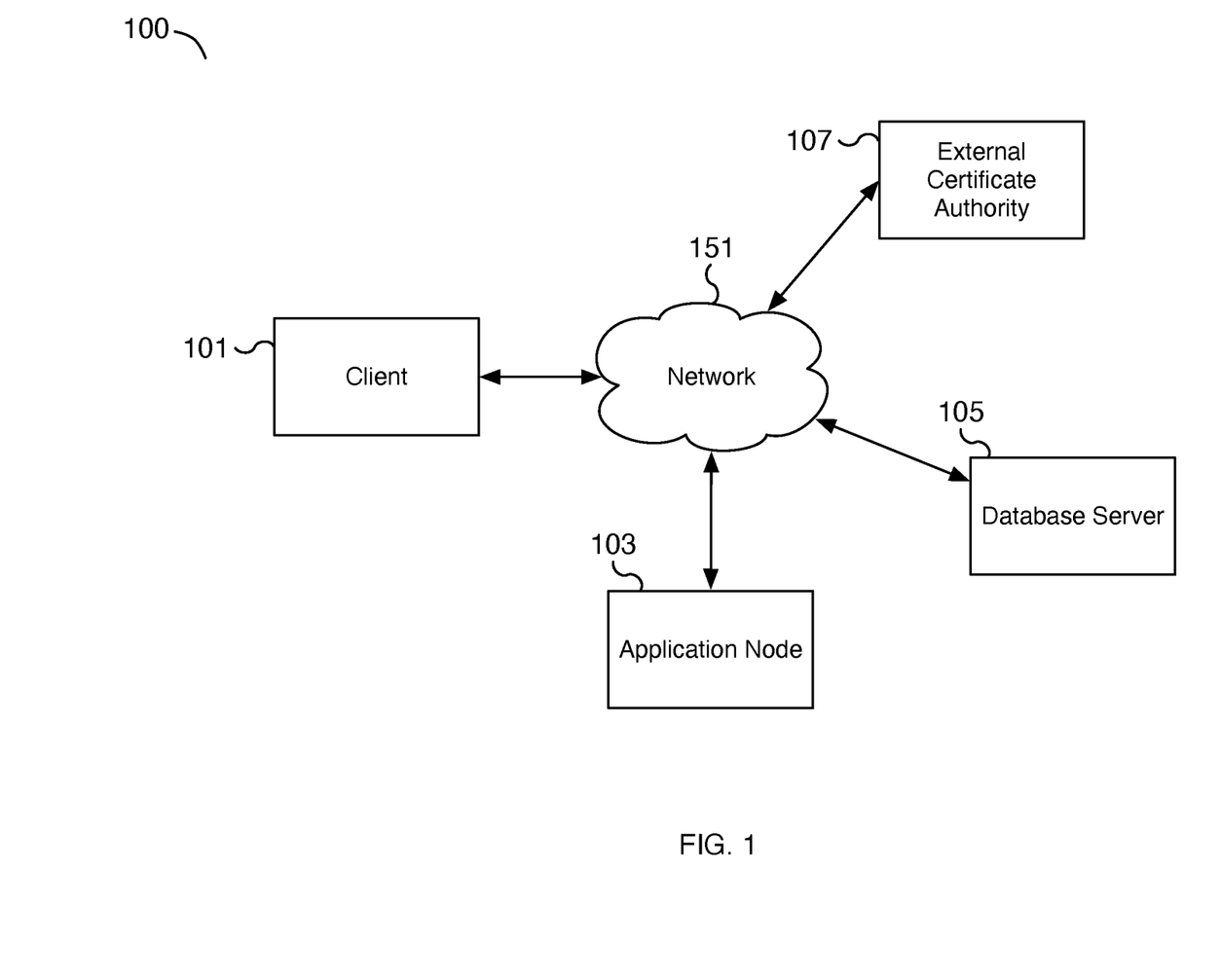
FIG. 1 is a block diagram illustrating an example of a cloud-based platform with customer-controlled authentication.

FIG. 1 is a block diagram illustrating an example of a cloud-based platform with customer-controlled authentication. In the example shown, cloud-based platform 100 includes components client 101, application node 103, database server 105, and external certificate authority 107 that are communicatively connected via network 151. Network 151 can be a public or private network. In some embodiments, network 151 is a public network such as the Internet. Client 101 is a network client and can be used to configure customer-controlled authentication of application node 103 with database server 105. In some embodiments, client 101 is also a client of database server 105. In the example shown, application node 103 is a network client of services offered by database server 105. Both application node 103 and database server 105 may be hosted by a cloud services provider independent of client 101. For example, a software-as-a-service application can run on application node 103 and access cloud-hosted customer data via database queries to a database server 105. Although the service offered in the example of FIG. 1 is a database service, database server 105 is just one example of an application server. Other application servers and corresponding services such as email, file sharing, and calendaring, etc. are appropriate as well and can be similarly configured with customer-controlled authentication.

In some embodiments, client 101 is utilized by a customer to configure and manage authentication and/or access to customer client services such as a database service running on database server 105. The access-controlled services, such as the database service of database server 105, and the clients that utilize the access-controlled services, such as application node 103, can be hosted by a third-party provider such as by a cloud-service provider. For example, client 101 can be utilized to generate private and public key pairs and a corresponding certificate credential to configure application node 103 with access to database server 105. Client 101 can further be utilized to request the issuance of a certificate credential for an approved client such as application node 103 from an issuer such as external certificate authority 107. For example, client 101 can request external certificate authority 107 to sign a client certificate for application node 103. Using the signed certificate, application node 103 can verify its identity to other network devices and services such as database server 105.

In some embodiments, application node 103 is a network client that is granted permission by the customer to access database server 105. Application node 103 is configured with certificate credentials and an associated digital signature to allow application node 103 access to database server 105. In some embodiments, the configuration is performed via client 101. In the event access for application node 103 to database server 105 should be revoked, the client certificate for application node 103 can be revoked. Without a valid client certificate, subsequent attempts by application node 103 to access database server 105 will be denied. In the example shown, application node 103 is one type of network client and other types of clients can exist as well. For example, an email client can be similarly configured with the appropriate client credentials to access an email service.

In some embodiments, database server 105 is a hardware server running a version of an operating system configured to only accept and allow network connections authenticated with a client certificate such as a client certificate from application node 103. Database server 105 can also be configured with an access control list to only allow access to specific pre-approved clients with the appropriate client certificate credentials. In addition to the hardware server running the configured operating system, database server 105 also includes a database system with a user-controlled authentication module that further verifies the validity of client certificates. In some embodiments, database server 105 connects with external certificate authority 107 to confirm that the provided certificate credential is valid before granting access to database services including access to encrypted customer data stored on database server 105. For example, after a client is authenticated via a client certificate by the operating system of database server 105, the application service of database server 105 validates the validity of the client certificate before a service request from the client can be serviced. In the example shown, database server 105 is one type of service and other types of application services can also be made available with customer-controlled authentication. For example, an email server can be similarly configured to authenticate and validate client credentials from an email client before granting access to a customer's cloud-hosted email.

In some embodiments, external certificate authority 107 is a certificate authority accessible by application services such as the database service of database server 105. External certificate authority 107 can be queried, for example, by application services, to validate the validity of an issued certificate. External certificate authority 107 can also be utilized to revoke, expire, or otherwise invalidate previously issued client certificates as well as to reactivate existing certificates or reissue new certificate credentials. For example, client 101 can utilize external certificate authority 107 to sign as well as revoke a client certificate for application node 103. In some embodiments, external certificate authority 107 is managed by an external organization separate from the organization managing and hosting application node 103 and/or database server 105. External certificate authority 107 can also be independent from client 101 and can be a well-known certificate authority with corresponding root certificates installed on application servers such as database server 105.

Although single instances of some components have been shown to simplify the diagram, additional instances of any of the components shown in FIG. 1 may exist. For example, a cloud-based service can include multiple application nodes such as application node 103 and multiple application servers such as database server 105. In some embodiments, application node 103 and database server 105 may be co-located in the same datacenter and/or reside on the same local network. In some embodiments, database server 105 may be replicated and/or distributed across multiple network components. In various embodiments, client 101 is just one example of a potential client for configuring customer-controlled authentication. In some embodiments, components not shown in FIG. 1 may also exist.

Figure 2:
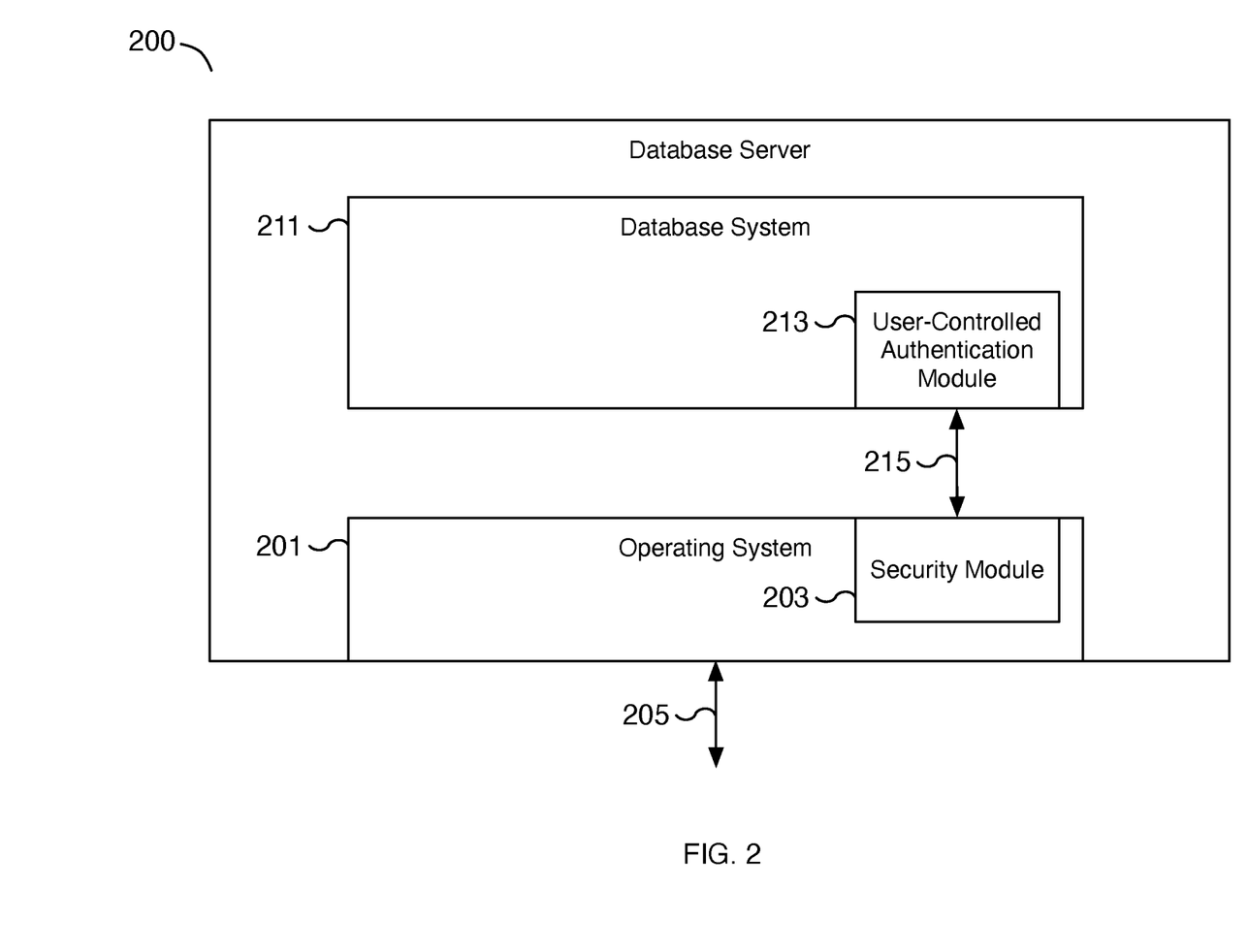
FIG. 2 is a block diagram illustrating an example of a database server configured with customer-controlled authentication.

FIG. 2 is a block diagram illustrating an example of a database server configured with customer-controlled authentication. In the example shown, database server 200 hosts a database service that includes at least the components operating system 201 and database system 211. Operating system 201 is the operating system of database server 200 and includes security module 203. Database system 211 is a collection of one or more application level processes of database server 200 running on operating system 201 that provides the database service to database clients. Database system 211 includes user-controlled authentication module 213. Operating system 201 and database system 211 can communicate via communications channel 215. In some embodiments, communications channel 215 may be implemented using a network connection such as a local network connection, inter-process communication (IPC), or another appropriate communication channel. Utilizing at least components security module 203 of operating system 201 and user-controlled authentication module 213 of database system 211, database server 200 is able to authenticate and validate clients prior to allowing access to the database service of database system 211. In the event a client's access has been revoked by a customer, the client is denied access to the database service. In the example shown, database server 200 communicates with external devices and/or services via network connections 205. For example, network connections 205 can include incoming database requests, outgoing certificate validation requests, and incoming configuration connections, among others.

In some embodiments, database server 200 is database server 105 of FIG. 1 and database server 200 can be hosted by a cloud provider for a customer. Network connections 205 can include connections to external devices such as client 101, application node 103, and/or external certificate authority 107 of FIG. 1. In various embodiments, database server 200 includes additional components that are not shown. Although shown with a database server as an example in FIG. 2, other application servers and corresponding services can be configured as described with respect to database server 200 to similarly enable customer-controlled authentication.

In some embodiments, operating system 201 is the operating system of database server 200 that is configured to only allow client connections that have been authenticated using a client certificate. For example, a client accessing database server 200 via network connections 205 must provide operating system 201 with a client certificate. Operating system 201 authenticates the client certificate to confirm the identity of the client. In some embodiments, the identity corresponds to a hostname and/or Internet Protocol (IP) address described by the certificate. In some embodiments, the client certificate corresponds to a user and the certificate can include an email or username identity information. In various embodiments, operating system 201 is configured to include a list of allowable clients and operating system 201 verifies that a received client certificate corresponds to one of the allowed clients. For example, the identity of a database client associated with an incoming network connection is authenticated using a received client certificate of the client. The included identity of the client certificate must match both the database client's identity and also belong to a list of allowed clients. In various embodiments, the received certificate also includes an associated digital signature to verify the information included in the client certificate is accurate. In some embodiments, the digital signature corresponds to a certificate authority responsible for issuing the client certificate. In some embodiments, the authentication steps are performed at least in part by security module 203 of operating system 201.

In some embodiments, security module 203 can provide security functionality including authentication functionality at the operating system level. For example, in some embodiments, security module 203 is an authentication module and may be implemented as one or more pluggable authentication modules for authenticating clients and/or users. Using security module 203, authentication functionality can be communicated between operating system 201 and database system 211. For example, an application such as database system 211 can request and/or require that clients associated with incoming connections be authenticated by operating system 201 using client certificate credentials. Similarly, in some embodiments, an application such as database system 211 can initiate the authentication of a client at the operating system level using a client certificate via security module 203.

In some embodiments, database system 211 is a database service that runs at the application level on top of operating system 201 and leverages existing security functionality including authentication functionality of operating system 201. Database system 211 includes multiple parts of a database system such as a database engine, a database store, and user-controlled authentication module 213, among others. User-controlled authentication module 213 can be implemented as a module to provide enhanced control over access to database services such as the ability for a customer to revoke access to database server 200. For example, user-controlled authentication module 213 can be utilized to verify the validity of client certificates associated with database requests. In some embodiments, after a client is authenticated by the operating system to authenticate the identity of the client, user-controlled authentication module 213 of database system 211 is utilized to confirm that the certificate is valid. In some embodiments, user-controlled authentication module 213 communicates to operating system 201 via communications channel 215. For example, user-controlled authentication module 213 can initiate a certificate validation request via security module 203. The validation request can connect to an external certificate authority via network connections 205 to determine whether the received client certificate is still valid. In the event the certificate is not valid, for example, the certificate has been revoked by the customer or is expired, access to the database and access to database services for the client are denied.

Figure 3:
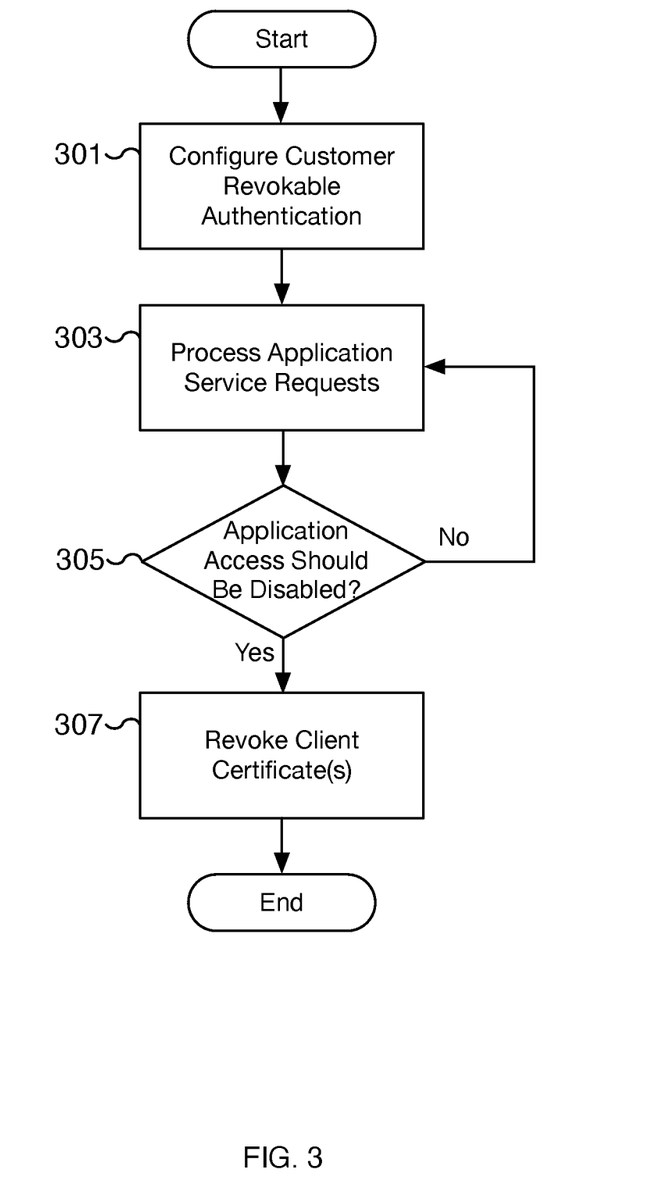
FIG. 3 is a flow chart illustrating an embodiment of a process for servicing application service requests for a cloud-based platform with customer-controlled authentication.

FIG. 3 is a flow chart illustrating an embodiment of a process for servicing application service requests for a cloud-based platform with customer-controlled authentication. In some embodiments, the cloud-based platform with customer-controlled authentication is the cloud-based platform of FIG. 1. For example, a customer utilizing client 101 of FIG. 1 controls access to the database service of database server 105 of FIG. 1 by granting and/or revoking access to the database service from application node 103 of FIG. 1. In some embodiments, the customer controls access to an application server such as database server 105 of FIG. 1 and/or database server 200 of FIG. 2 despite both the client of the service, such as application node 103 of FIG. 1, and the server hosting the service being hosted by a cloud provider.

At 301, customer revokable authentication is configured. For example, a customer of a cloud provider enables customer-controlled authentication for a cloud-based platform by first configuring customer revokable authentication at the cloud-based application service and application service clients. In some embodiments, the customer installs client certificates signed by an external certificate authority for each approved network client and configures the application server to grant permission for the approved clients to access the service when the appropriate client credentials are presented. The customer further configures the application service to only allow authentication via client certificates. For example, before an application service request such as a database query can be processed by the applicable application service, a client must first authenticate with the application service by providing approved client certificate credentials. Other access and authentication methods are disabled. In some embodiments, the application service is also configured to confirm that the provided client certificate credentials are currently valid. For example, a revoked or expired certificate will result in all service requests being denied to the client. In some embodiments, the authentication of clients is performed at the operating system level at least in part by an operating system security module such as security module 203 of FIG. 2. In some embodiments, the validation of certificate credentials is performed at the application level by a user-controlled authentication module of the application service such as user-controlled authentication module 213 of FIG. 2.

At 303, application service requests are processed. For example, a client that is authenticated has its requests propagated to the application service. Once the application service verifies that the appropriate client credentials are still valid, the application service request is processed by the application service. In some embodiments, the application service request is a database query for encrypted customer data stored by a database server. The authentication and verification checks performed in advance of servicing a request allow the request to be denied in the event that either of the authentication or verification checks fails. In some embodiments, the application service request is for another similarly configured service other than a database service. For example, the application service can be an email service, a file hosting service, a customer database management service, or another appropriate service that is configured for customer-controlled authentication.

In some embodiments, at 303, the application service request also corresponds to a request to start (or restart) the application service. For example, a database application is started and performs a startup process including determining whether to decrypt encrypted data such as encrypted database table data. The startup process is similar to servicing incoming requests and the application service first confirms that any connected clients have valid credentials before continuing with the startup process. By first verifying the access validity of clients with existing connections, the startup process can abort the decryption of any encrypted data in the event a connected client is no longer valid and its access has been revoked.

At 305, a determination is made that access to the application service should be disabled. The determination can be made by a customer for a particular client, a subset of clients, or for all clients with access to the cloud-hosted application service. For example, a customer decides to disable access to the cloud-hosted application service from all clients including clients previously granted permission to access the service. The clients verified include newly connected clients and can also include already connected clients. For example, existing clients may have connected to the operating system of the application service while the service was not running and are validated during startup of the application service. In the event access should be disabled, processing proceeds to step 307. In the event no changes to access are made and access should not be disabled, processing proceeds back to step 303 where application service requests continue to be processed for authenticated and validated clients.

At 307, one or more client certificates are revoked. For example, for any clients that a determination is made at 305 that access to the application service should be revoked, a customer revokes the corresponding client's client certificate. In some embodiments, a client certificate is revoked (or expired) by notifying the certificate authority that issued the corresponding client certificate. Once a client's certificate credentials are no longer valid, the client is no longer able to access the application service and all requests to the application service will be denied including access to customer data managed by the application service. In some embodiments, if at any point a customer wishes to re-enable access to the application service for a particular client, the customer can reissue new credentials or reactivate the appropriate client certificate by coordinating with the certificate authority.

Figure 4:
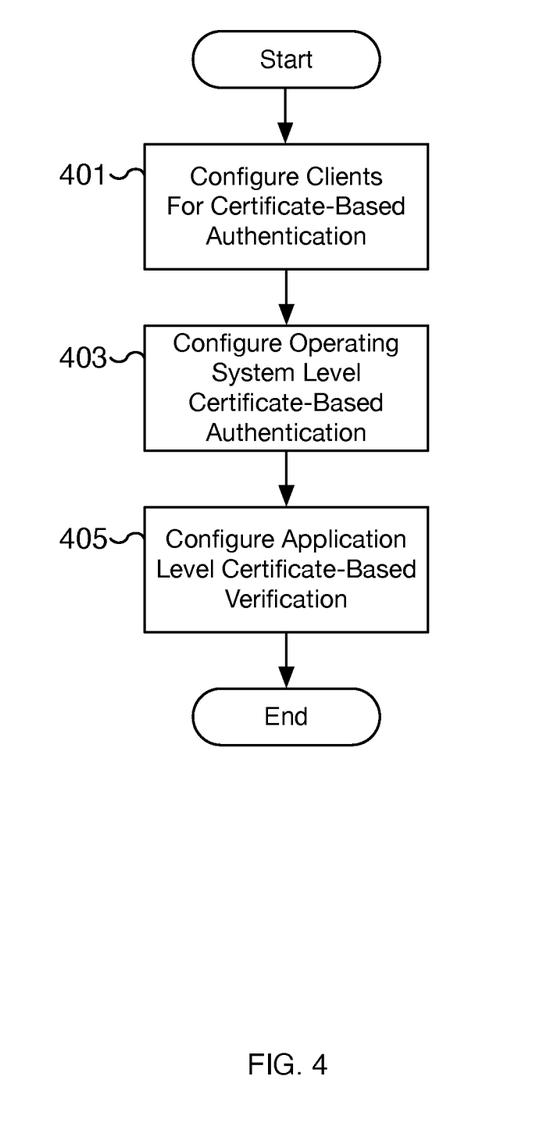
FIG. 4 is a flow chart illustrating an embodiment of a process for configuring customer-controlled authentication for a cloud-based platform.

FIG. 4 is a flow chart illustrating an embodiment of a process for configuring customer-controlled authentication for a cloud-based platform. In some embodiments, the cloud-based platform configured with customer-controlled authentication is the cloud-based platform of FIG. 1. In some embodiments, the configuration process of FIG. 4 is performed at 301 of FIG. 3. For example, a customer applies the process of FIG. 4 via client 101 of FIG. 1 to control access to the database service of database server 105 of FIG. 1 by granting access to the database service for application node 103 of FIG. 1.

At 401, approved clients are configured for certificate-based authentication. For example, clients approved by a customer to access an application service hosted by a cloud provider are configured with client certificates that are utilized to connect with the application service. The client certificates are issued by a certificate authority such as external certificate authority 107 of FIG. 1. The certificate authority can be later utilized by the customer to revoke the client's access credentials. By revoking all client certificates, a customer blocks all access to the application service. Associated with each issued certificate is a corresponding private key. In various embodiments, the clients are each configured with their corresponding private key which is utilized when authenticating with the application service when using the client certificate.

In some embodiments, multiple private keys and client certificates are issued for a single client. The additional private key and certificates can be used for different access roles such as backup access and administration, among others. For example, in the event a private key and public key/certificate pair are compromised, the compromised client certificate can be revoked, and a backup key can be utilized to minimize service interruptions. As another example, in the event a client certificate expires, a backup key can be utilized to minimize service interruptions while a new certificate is reissued.

At 403, an operating system level certificate-based authentication is configured for an application service. For example, the operating system of the application service such as operating system 201 of FIG. 2 is configured to authenticate clients using client certificates. In various embodiments, each configured client certificate includes an associated digital signature from a certificate issuing authority validating the contents of the certificate. Other methods or forms of authentication for the client can be disabled. For example, a client can only access the application service by providing the correct client certificate credentials. In some embodiments, all access to the application service at the operating system level requires client certificate-based authentication and all other forms of authentication such as username/password are disabled.

In some embodiments, the operating system is also configured with a list of approved clients. The clients on the list of approved clients correspond to the clients configured at 401 with client certificates. When a client connects to the application service via a network connection, such as one of network connections 205 of FIG. 2, the client's certificate is authenticated using the client's private key and the list of approved clients configured with the operating system. In some embodiments, the list of approved clients includes each client's corresponding approved level of access. In some embodiments, the operating system level certificate-based authentication is configured at least in part using a security module of the operating system such as security module 203 of FIG. 2.

At 405, an application level certificate-based verification is configured for an application service. For example, the application service is configured to only allow access to clients who have been authenticated by the operating system using certificate-based authentication. The application service is also configured to verify the validity of client credentials that the operating system has authenticated. The verification for validity ensures that a client authenticated at 403 with a certificate that is no longer valid, for example, a certificate that is expired or revoked, is not allowed access the application service. In some embodiments, the application level certificate-based verification is configured via a user-controlled authentication module of the application system such as user-controlled authentication module 213 of FIG. 2. In various embodiments, the verification for validity is performed on newly connected clients as well as on clients with existing connections. For example, a client connection that has been previously verified can be subject to re-verification including periodic re-verification after a configured time interval. In the event a client's access is revoked by the customer subsequent to an initial approved connection to the application server and/or application service, the client's subsequent access can be denied based on subsequent verification checks. As another example, clients that connect to the application server while the application service is not running are validated during the startup of the application service.

In some embodiments, the operating system can additionally validate the validity of a certificate. However, at 405, the application level certificate-based verification is configured to add an application level check on the client's access in addition to a potential check performed at the operating system level.

In various embodiments, the application service is also configured with a list of approved clients and their corresponding levels of access. The application service can be configured to perform an application level check to compare a client whose identity has been authenticated to the clients that are approved access to the application service. For example, multiple application services may be running on the same application server and operating system, but each application service is configured to allow access to a different set of approved clients. This configuration allows the different application services to grant different levels of access to different authenticated clients.

Figure 5:
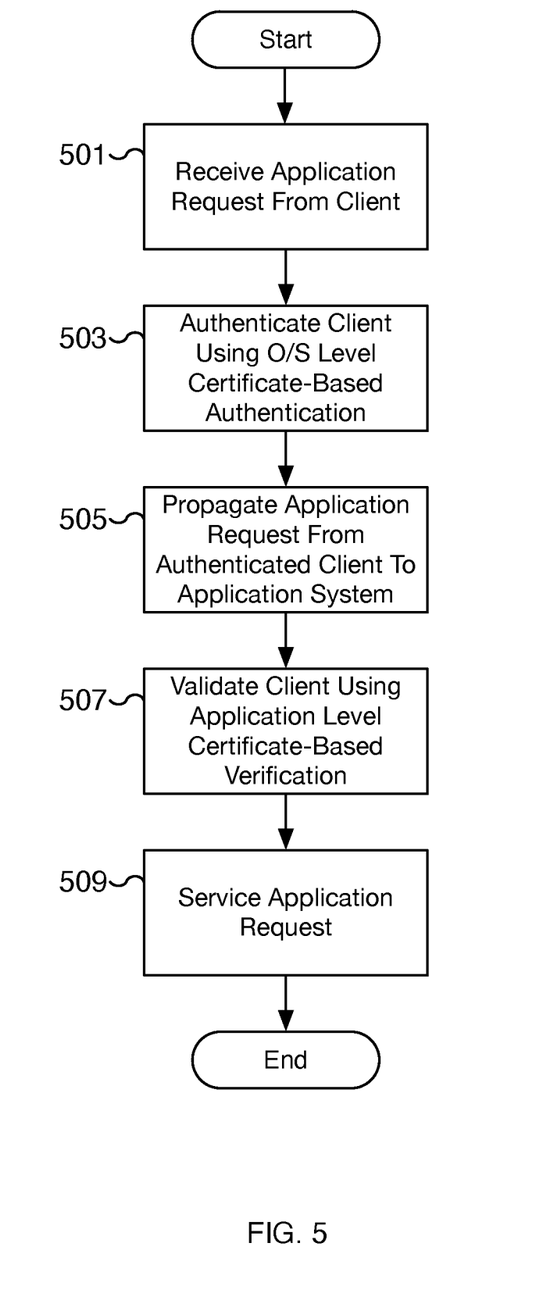
FIG. 5 is a flow chart illustrating an embodiment of a process for authorizing a client to access a cloud-based application service configured with customer-controlled authentication.

FIG. 5 is a flow chart illustrating an embodiment of a process for authorizing a client to access a cloud-based application service configured with customer-controlled authentication. For example, the process of FIG. 5 can be performed by an application server hosted by a cloud-based platform to process an incoming application service request, such as a database query for encrypted customer data. In some embodiments, the process of FIG. 5 is performed by database server 105 of FIG. 1 and/or database server 200 of FIG. 2. In some embodiments, the cloud-based platform servicing the application service request is the cloud-based platform of FIG. 1, the client accessing the service is application node 103 of FIG. 1, and the application service is the application service of database server 105 of FIG. 1 and/or database server 200 of FIG. 2. In some embodiments, the process of FIG. 5 is performed at step 303 of FIG. 3. In some embodiments, the customer-controlled authentication is configured using the process of FIG. 4.

At 501, an application service request is received from a client. For example, an incoming network connection is received at an application server such as database server 105 of FIG. 1 and/or database server 200 of FIG. 2. The network connection may be one of network connections 205 of FIG. 2. The incoming application service request may be a request such as a database query and may seek to access customer data that is highly confidential.

At 503, the client is authenticated using certificate-based authentication performed at the operating system level. For example, as part of the request received at 501, a network connection is established between the client and application server, and the client is authenticated using certificate-based authentication. The authentication can be performed by the operating system using a network security module. In some embodiments, the authentication is performed by security module 203 of FIG. 2. In various embodiments, as part of the certificate-based authentication process, a client certificate credential and an associated signature are received at the application server and the client must have access to a corresponding private key of the certificate in order to be authenticated.

At 505, an application request from an authenticated client is propagated to the application system. For example, once the client has been authenticated at the operating system level at 503, the application request is propagated to the application system such as database system 211 of FIG. 2 for further verification. At 505, the application system is made aware of an incoming request made by an authenticated client but does not begin servicing the request until the client's access is verified as valid at 507.

At 507, the client is validated using certificate-based verification performed at the application level. For example, the client credential and associated signature are verified as valid by contacting the issuing certificate authority. The confirmation ensures that the client's certificate is not expired and has not been revoked. In some embodiments, the verification is performed at least in part by a user-controlled authentication module of the application system such as user-controlled authentication module 213 of FIG. 2 in coordination with the operating system and a security module of the operating system such as security module 203 of FIG. 2. In various embodiments, the verification step includes confirming that a valid and authenticated client has permission to access the application service and the type of permissions the client has been granted by the customer.

At 509, the application request is serviced. For example, once the client has been authenticated and its client credentials verified, the included application service request is processed. For example, at 509, a database query of an application request is processed by a database engine of the application system and can access the corresponding data store of the application system. In various embodiments, the serviced request is able to access customer data including encrypted data whose access is controlled by the customer and can be revoked by the customer in the future.

Figure 6:
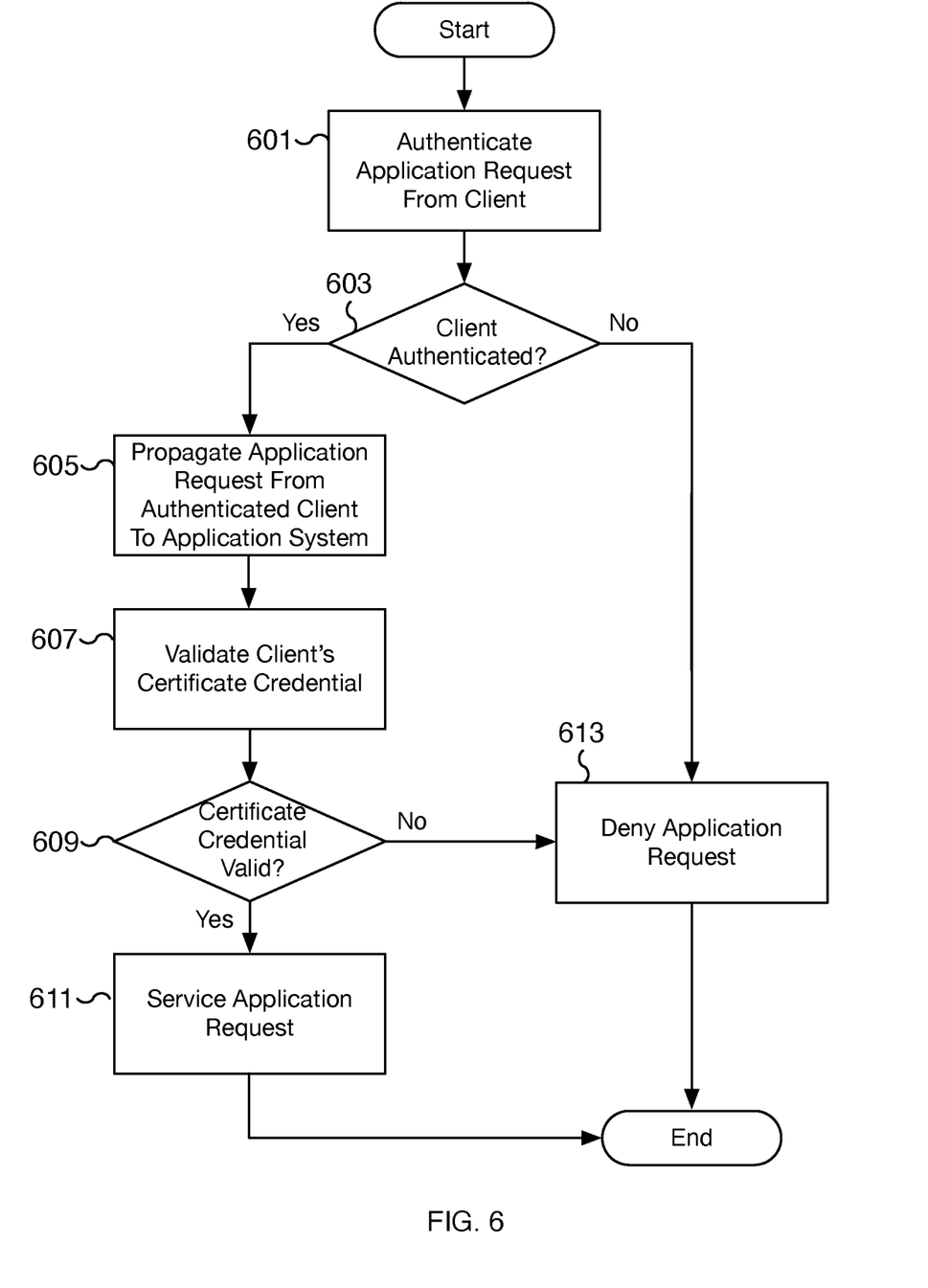
FIG. 6 is a flow chart illustrating an embodiment of a process for authorizing a client to access a cloud-based application service configured with customer-controlled authentication.

FIG. 6 is a flow chart illustrating an embodiment of a process for authorizing a client to access a cloud-based application service configured with customer-controlled authentication. Although access to the application service is determined using the process of FIG. 6, client access is controlled by the customer and can be revoked by the customer at any time. In some embodiments, the process of FIG. 6 is performed at 503, 505, and/or 507 of FIG. 5 to either deny an application request to an application service or to approve and pass along the request for processing by the application service. In some embodiments, whether the request is approved or denied is controlled by the customer using a customer-controlled authentication platform such as the cloud-based customer-controlled authentication platform of FIG. 1. In some embodiments, the process of FIG. 6 is performed by database server 105 of FIG. 1 and/or database server 200 of FIG. 2.

At 601, an application request from a client is authenticated. For example, a request such as a database query is received at an application server and the client is first authenticated using a client certificate with an associated signature provided by the client. In various embodiments, the client's identity is authenticated. For example, the Internet Protocol (IP) address and/or hostname of the client used to establish a network connection with the application server is compared to the IP address and/or hostname included in the client certificate. In some embodiments, the associated signature provided by an issuing authority is verified as authentic.

At 603, a determination is made whether the client has been authenticated. In the event the client has been properly authenticated, processing continues to step 605. In the event the client has not been authenticated, processing continues to step 613. For example, a client may fail authentication if the client does not provide a client certificate or the information of the certificate does not match the properties of the client.

At 605, the application service request from the authenticated client is propagated to the application system. For example, once the client has been authenticated at the operating system level at 601, the application request is propagated to the application for further verification. At 605, the application system is made aware of an incoming request made by an authenticated client but does not begin servicing the request until additional verification steps can be performed.

At 607, the client's certificate credential is validated. For example, the application system verifies the validity of the provided client certificate at the application level. In various embodiments, the received client credential and associated signature is verified as valid by contacting the issuing certificate authority of the certificate. The confirmation ensures that the client's certificate is not expired and has not been revoked. In some embodiments, the verification is performed at least in part by a user-controlled authentication module of the application system such as user-controlled authentication module 213 of FIG. 2 in coordination with the operating system and a security module of the operating system such as security module 203 of FIG. 2.

At 609, a determination is made whether the client's certificate credential is valid. In the event the certificate credential is valid, processing continues to step 611. In the event the certificate credential is not valid, processing continues to step 613. For example, a certificate credential may be found invalid if the corresponding client certificate is expired or has been revoked, for example, by the customer to prevent access from the client to the application system.

At 611, the application request from an authenticated and verified client is serviced. For example, once the client has been authenticated and its client credentials verified as valid, the included application service request is processed. In some embodiments, the processing of the request includes determining what (if any) access permissions the client has with respect to the application service. For example, a database query can be processed by a database engine of the application system and requires access to the corresponding data store of the application system. Serving the request may require access to customer data including encrypted data. In some embodiments, servicing the application service request includes confirming that a valid and authenticated client has permission to access the application service and identifying the type of permissions the client has been granted by the customer. For example, a database query request initiated from a client requires that the client has been granted at least read (and possibly write) access to the relevant database tables. In various embodiments, servicing of the request is processed by the application system such as database system 211 of FIG. 2.

At 613, the application service request is denied. For example, a request can be denied in the event the client failed to authenticate its identity using proper client credentials or the credentials are no longer valid. At 613, access to the application service including access to customer data stored by the application service is denied. To access the application service, the client will need its credentials reinstated or will need to be reissued new credentials by the customer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a certificate credential of a client and an associated signature;
authenticating the certificate credential and the associated signature at an operating system level using a private key of the client and using a listing of approved clients, each client of the approved clients having corresponding specified one or more allowed level of application service access;
in response to the authentication of the certificate credential, triggering an application level validation of the certificate credential;
validating at an application level via an external certificate authority whether the certificate credential has expired; and
allowing access to encrypted data allowed by the corresponding specified one or more allowed level of application service access associated with the certificate credential of the client based at least in part on the authentication and the validation of the certificate credential.

2. The method of claim 1, wherein the certificate credential identifies a client Internet Protocol (IP) address or client hostname.

3. The method of claim 1, wherein the associated signature includes a digital signature of the external certificate authority.

4. The method of claim 1, wherein authenticating the certificate credential and the associated signature at the operating system level is performed as part of establishing a network connection with the client.

5. The method of claim 4, wherein the certificate credential and the associated signature are received from the client via the network connection with the client.

6. The method of claim 1, wherein an application system performs the validating of whether the certificate credential has expired.

7. The method of claim 6, wherein the application system is a database system, an email system, or a file sharing system.

8. The method of claim 1, further comprising configuring at the operating system level a requirement that authentication is performed using a client certificate.

9. The method of claim 1, further comprising configuring at the application level a requirement that authentication is performed at the operating system level using a client certificate.

10. The method of claim 1, wherein validating at the application level via the external certificate authority whether the certificate credential has expired includes receiving at the application level the certificate credential and the associated signature from a security module implemented at the operating system level.

11. A system, comprising:
one or more processors; and
a memory coupled to the one or more processors, wherein the memory is configured to provide the one or more processors with instructions which when executed cause the one or more processors to:
receive a certificate credential of a client and an associated signature;
authenticate the certificate credential and the associated signature at an operating system level using a private key of the client and using a listing of approved clients, each client of the approved clients having corresponding specified one or more allowed level of application service access;
in response to the authentication of the certificate credential, trigger an application level validation of the certificate credential;
validate at an application level via an external certificate authority whether the certificate credential has expired; and
allow access to encrypted data allowed by the corresponding specified one or more allowed level of application service access associated with the certificate credential of the client based at least in part on the authentication and the validation of the certificate credential.

12. The system of claim 11, wherein the certificate credential identifies a client Internet Protocol (IP) address or client hostname.

13. The system of claim 11, wherein the associated signature includes a digital signature of the external certificate authority.

14. The system of claim 11, wherein causing the one or more processors to authenticate the certificate credential and the associated signature at the operating system level includes establishing a network connection with the client.

15. The system of claim 14, wherein the certificate credential and the associated signature are received from the client via the network connection with the client.

16. The system of claim 11, wherein an application system causes the one or more processors to validate at the application level via the external certificate authority whether the certificate credential has expired.

17. The system of claim 16, wherein the application system is a database system, an email system, or a file sharing system.

18. The system of claim 11, wherein the memory is further configured to provide the one or more processors with instructions which when executed cause the one or more processors to:
configure at the operating system level a requirement that authentication is performed using a client certificate.

19. The system of claim 11, wherein the memory is further configured to provide the one or more processors with instructions which when executed cause the one or more processors to:
configure at the application level a requirement that authentication is performed at the operating system level using a client certificate.

20. A computer program product, the computer program product being embodied in a non-transitory computer readable storage medium and comprising computer instructions for:
receiving a certificate credential of a client and an associated signature;
authenticating the certificate credential and the associated signature at an operating system level using a private key of the client and using a listing of approved clients, each client of the approved clients having corresponding specified one or more allowed level of application service access;
in response to the authentication of the certificate credential, triggering an application level validation of the certificate credential;
validating at an application level via an external certificate authority whether the certificate credential has expired; and
allowing access to encrypted data allowed by the corresponding specified one or more allowed level of application service access associated with the certificate credential of the client based at least in part on the authentication and the validation of the certificate credential.

* * * * *